(12) United States Patent
Ickinger et al.

(10) Patent No.: US 7,114,940 B2
(45) Date of Patent: Oct. 3, 2006

(54) ELECTROMOTIVE ADJUSTMENT DRIVE FOR AN INJECTION UNIT

(75) Inventors: Georg Michael Ickinger, Graz (AT); Kittappa Gowda Harish, Chennai (IN); Mangalasseril Saju, Chennai (IN); Shanmugham Sivakumar, Chennai (IN); Mathrubootmam Kumar, Chennai (IN); Anand Sukumaran Vivek, Chennai (IN)

(73) Assignees: Demag Ergotech GmbH, Schwaig (DE); L & T-Demag Plastics Machinery Private Limited, Chennai (IN)

( * ) Notice: Subject to any disclaimer, the term of this patent is extended or adjusted under 35 U.S.C. 154(b) by 148 days.

(21) Appl. No.: 10/995,057

(22) Filed: Nov. 22, 2004

(65) Prior Publication Data

US 2005/0147704 A1 Jul. 7, 2005

Related U.S. Application Data

(63) Continuation of application No. PCT/EP03/02606, filed on Mar. 13, 2003.

(30) Foreign Application Priority Data

Mar. 13, 2003 (DE) ................................ 102 22 748

(51) Int. Cl.
*B29C 45/80* (2006.01)

(52) U.S. Cl. ...................................... 425/145; 425/150

(58) Field of Classification Search ................ 425/145, 425/149, 150
See application file for complete search history.

(56) References Cited

U.S. PATENT DOCUMENTS 5,645,868 A 7/1997 Reinhart
6,461,139 B1 * 10/2002 Yokoya et al. .............. 425/149

FOREIGN PATENT DOCUMENTS

JP 06 091709 A 4/1994

* cited by examiner

*Primary Examiner*—Tim Heitbrink
(74) *Attorney, Agent, or Firm*—Henry M. Feiereisen

(57) ABSTRACT

An electromotive adjustment drive includes an electric drive having a single motor with a rotor having a magnetic pole assembly, and a stator interacting with the rotor and having a magnetic pole assembly. The rotor is operatively connected to a member, such as a plasticizing screw of an injection unit, and is constructed for movement along a travel path, whereby one of the magnetic pole assemblies of the rotor and the stator is extended in relation to the other one of the magnetic pole assemblies of the rotor and the stator by a portion corresponding to the travel path. A spindle drive is positioned between the rotor and a motor housing and has a first transmitting element which is operatively connected to the rotor, and a second transmitting element which supports the first transmitting element. A plurality of switching elements is constructed for selective operation of the electric drive as a rotary drive or as injection drive.

8 Claims, 1 Drawing Sheet

ELECTROMOTIVE ADJUSTMENT DRIVE FOR AN INJECTION UNIT

CROSS-REFERENCES TO RELATED APPLICATIONS

This application is a continuation of prior filed copending PCT International application no. PCT/EP03/02606, filed Mar. 13, 2003, which designated the United States and on which priority is claimed under 35 U.S.C. §120, and which claims the priority of German Patent Application, Serial No. 102 22 748.9, filed May 23, 2002, pursuant to 35 U.S.C. 119(a)–(d).

BACKGROUND OF THE INVENTION

The present invention relates, in general, to an electromotive drive for operating a member to execute a linear movement and a rotary movement, and more particularly to an electromotive adjustment drive for an injection unit of an injection molding machine to rotate a plasticizing screw for carrying out the plasticizing phase and to linearly move the plasticizing screw for carrying out the injection phase.

Nothing in the following discussion of the state of the art is to be construed as an admission of prior art.

U.S. Pat. No. 5,645,868 describes a drive apparatus for an injection unit, including a hollow-shaft motor which is axially aligned with a spindle drive comprised of a ball screw with a ball nut. The drive apparatus uses a single electric motor and three one-way clutches to provide both the injection and plasticizing functions. Two one-way clutches are engaged to prevent a rotation of the plasticizing screw and to couple the spindle drive with the electric motor, when the plasticizing screw is intended to execute the injection function, whereas the third one-way clutch operatively connects the electric motor directly with the plasticizing screw, while the other one-way clutches slip, when the plasticizing screw is intended to execute the plasticizing function. This single motor drive requires the provision of an auxiliary motor to control the back pressure of the plastic melt during the plasticizing function. In addition, except for the ball nut, all drive components of the drive apparatus, including both motors and the ball screw, associated bearings, and the one-way clutches, must be moved axially together with the plasticizing screw in relation to the extruder barrel so that the overall mass being moved and supported is very large.

It would therefore be desirable and advantageous to provide an improved electromotive adjustment drive to obviate prior art shortcomings and to significantly reduce power consumption as well as to significantly decrease the stress to which bearings are subjected during operation of the member being moved and rotated.

SUMMARY OF THE INVENTION

According to one aspect of the present invention, an electromotive adjustment drive includes an electric drive having a single motor with a motor housing, a rotor having a magnetic pole assembly, and a stator interacting with the rotor and having a magnetic pole assembly, with the rotor and stator being received in the motor housing, wherein the rotor is operatively connected to a member being adjusted, and constructed for movement relative to the motor housing along a travel path, wherein one of the magnetic pole assemblies of the rotor and the stator is extended in relation to the other one of the magnetic pole assemblies of the rotor and the stator by a portion corresponding to the travel path, a spindle drive positioned between the rotor and the motor housing and having a first transmitting element operatively connected to the rotor, and a second transmitting element supporting the first transmitting element, and a switching assembly constructed for selective operation of the electric drive as a rotary drive or as injection drive.

The present invention resolves prior art problems by constructing the adjustment drive in such a way that essentially only the rotor of the electric motor together with the screw-side rotor support and the first transmission element, which is caused to rotate by the rotor, are moved axially during the injection phase of the plasticizing screw. The main mass of the single-motor drive, i.e. the entire motor housing including the stator and the housing-side bearings remain stationary in relation to the extruder barrel of the injection unit. In other words, the mass being moved in linear direction and supported is greatly decreased so that power consumption by the single-motor drive is significantly reduced and linear guides for the axially moving drive components can be liberated from reactive moments of the electric motor.

According to another feature of the present invention, the second transmitting element may be rotatably supported by the motor housing, wherein the switching assembly may include a first switching element operatively connected to the rotor and constructed for selective engagement with the member (e.g. plasticizing screw) to thereby realize a fixed rotative connection between the rotor and the member, a second switching element actuatable to restrain the member against rotation, and a third switching element actuatable to inhibit an axial movement of the second transmitting element and constructed for variable torque transmission. By constructing the third switching element axially immobile relative to the motor housing and thus also to the plasticizing screw, the mass being moved is further decreased, when the plasticizing screw advances linearly during the injection phase.

According to another feature of the present invention, the first switching element may be implemented as a switchable coupling, whereas the second switching element may be constructed as a one-way locking mechanism or brake, and the third switching element may be configured as a variable brake. In this way, operation of the single-motor drive between forward linear movement and rotating movement can be changed without reversing the rotation direction, and back pressure can be controlled in the absence of any further drive motor simply by activating the brake function of the second switching element.

According to another feature of the present invention, the motor and the spindle drive and the member may be arranged in coaxial relationship to one another. This configuration saves space, and the need for transmission drives, e.g. belt drives, that are required for an eccentric disposition and prone to wearing, is eliminated.

According to another feature of the present invention, the rotor may be constructed as hollow-shaft rotor defining an interior space into which the spindle drive projects. This configuration further promotes an overall compact construction of the adjustment drive.

According to another feature of the present invention, the magnetic pole assembly of the stator may be made longer in axial direction in relation to the magnetic pole assembly of the rotor. As a result, the forces of inertia are further reduced.

According to another feature of the present invention, the first transmitting element may be a threaded nut in fixed rotative engagement with the rotor, whereas the second transmitting element may be a spindle shaft which is rotatably supported by and axially immobile relative to the motor housing.

According to another aspect of the present invention, an injection unit for an injection molding machine includes a plasticizing screw, and an electromotive adjustment drive which is constructed in a manner described above and provided for movement of the plasticizing screw in axial direction and for rotation of the plasticizing screw.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
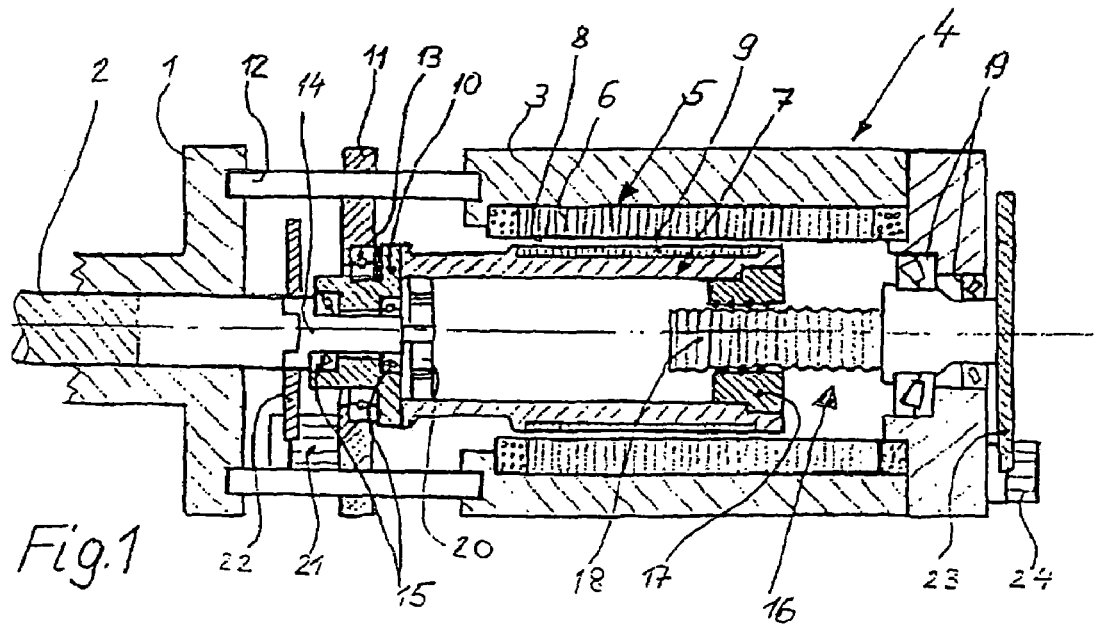
FIG. 1 is a longitudinal section of an exemplary injection unit having incorporated therein an electromotive adjustment drive according to the present invention for operating a plasticizing screw, shown here in a forward position after carrying out an injection stroke.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a longitudinal section of an exemplary injection unit having incorporated therein an electromotive adjustment drive according to the present invention. Of course, the principles described in the following description with respect to the injection unit of an injection molding machine are made by example only and are equally applicable to any technical field that requires the provision of combined linear and rotating movements and generally follows the concepts outlined here.

The injection unit of the injection molding machine includes an extruder barrel 1 and a plasticizing screw 2 which is fitted in the barrel 1. FIG. 1 shows only the rearward portion of the barrel 1 and the plasticizing screw 2. Securely mounted to the barrel 1 is a motor housing 3 of a single-motor drive, generally designated by reference numeral 4. The single-motor drive 4 includes a stator 5, which is secured to the housing 3 and has an electrically excitable magnetic pole assembly 6, and a hollow-shaft rotor 7 having an electrically excitable magnetic pole assembly 9 which is magnetically coupled to the magnetic pole assembly 6 via an air gap 8. The rotor 7 has a screw-proximal end mounted to a hollow-shaft trunnion 10 which rotatably supports a load-carrying bridge 11 through intervention of rolling bearings 13. The load-carrying bridge 11 is traversed by a linear guide assembly 12 which extends in axis-parallel relationship to a rotation axis of the rotor 7 and the plasticizing screw 2 and has one end received in the barrel 2 and an opposite end received in the motor housing 3. Thus, the rotor 7 is guided by the linear guide assembly 12 for movement in axial direction relative to the housing 3 and the plasticizing screw 2 and is able to rotate as the result of the rolling-bearing mounted support with respect to the load-carrying bridge 11.

The plasticizing screw 2 is securely connected to a journal 14 which is fitted in the trunnion 10 and supported therein through intervention of a bearing assembly 15 comprised of axial thrust bearings and radial bearings. As a consequence, the plasticizing screw 2 is rendered axially immobile relative to the trunnion 10 and thus to the rotor 7 but is able to rotate relative to the trunnion 10 and thus to the rotor 7.

The rotor 7 defines an interior space for accommodating a spindle drive in the form of a ball screw mechanism, generally designated by reference numeral 16 and including a threaded nut 17, which is disposed in fixed rotative engagement with the rotor 7, and a spindle shaft 18, which is supported by the motor housing 3 through intervention of a bearing assembly 15 comprised of axial thrust bearings and radial bearings 19 so that the spindle shaft 18 is axially immobile but able to rotate.

The single-motor drive 4 provides rotation of the plasticizing screw 2 to plasticize material in the barrel 2 during the plasticizing phase and movement of the plasticizing screw 2 in axial linear direction to perform the injection stroke for injection of plasticized material into a mold cavity (not shown) of the injection molding machine. The operational change of the single-motor drive 4 between the plasticizing phase and the injection phase is implemented by the arrangement of three selectively actuated switching elements. A first switching element in the form of a selectively engageable coupling 20 is disposed between the rotor 7 and the trunnion 14, a second switching element in the form of a one-way coupling or brake 21 acts upon the plasticizing screw 2 to allow rotation in one rotation direction only and includes a brake disc 22 which is non-rotatably fixed on the trunnion 14, and a third switching element in the form of a variable brake 24 which interacts with a brake disc 23 secured on the spindle shaft 18.

Figure 2:
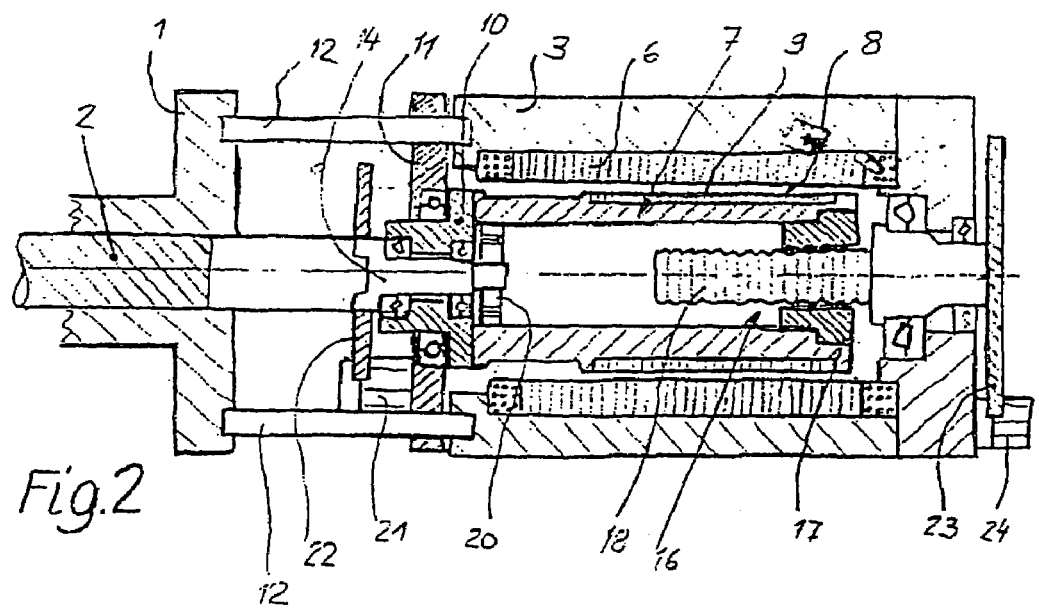
FIG. 2 is a longitudinal section of the injection unit, showing the plasticizing screw in a rearward position before carrying out the injection stroke.

The mode of operation of the single-motor drive 4 will now be described with reference to FIGS. 1 and 2. FIG. 2 shows hereby the plasticizing screw 2 in a rearward position. In order to initiate the forward movement from the rearward position shown in FIG. 2 to perform the injection stroke, the brakes 21 and 24 are applied so that the plasticizing screw 2 is locked to the load-carrying bridge 11 and the spindle shaft 18 is locked to the motor housing 3. In other words, both the plasticizing screw 2 and the spindle shaft 18 are restrained against rotation. Coupling 20 remains hereby disengaged. As a consequence, the rotor 7 is able to rotate the threaded nut 17 and thus moves axially forwards and thereby moves the plasticizing screw 2 forwardly in the absence of any rotation thereof. A linear movement of the rotor 7 is hereby realized by the load-carrying bridge 11 and the linear guide assembly 12. At the end of the injection stroke, the rotor 7 of the single-motor drive 4 assumes the forward position as shown in FIG. 1.

The stator-side magnetic pole assembly 6 is hereby prolonged or extended in relation to the rotor-side magnetic pole assembly 9 by a portion in correspondence to the travel path of the rotor 7 during the injection stroke. Thus, a same magnetic coupling action is realized during the entire travel path of the rotor 7.

In the plasticizing phase, the plasticizing screw 2 is operated in the one rotation direction. As a result, material introduced into the barrel 1 is plasticized within the barrel 1 and advanced toward a screw end chamber (not shown) at the opposite end of the barrel 1. As material accumulates in the screw end chamber, pressure builds up (back pressure) and causes the plasticizing screw 2 to move rearwards. Brake 21 is hereby released and the coupling 20 engages so that the rotor 7 is able to operate the plasticizing screw 2 with the required rotation speed. Operation of the brake 24 is so controlled that the spindle shaft 18 rotates substantially at a same rotation speed as the rotor 7. The velocity by which the plasticizing screw 2 retracts is governed by the difference in rotation speed, and the back pressure of the plasticizing screw 2 is governed by the brake force.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An injection molding apparatus having an electromotive adjustment drive, said electromotive adjustment drive comprising:

an electric drive for operating a plasticizing screw, said drive having a single motor having a motor housing, a rotor having a first magnetic pole assembly, and a stator interacting with the rotor and having a second magnetic pole assembly, said rotor and said stator being received in the motor housing, said rotor being operatively connected to the plasticizing screw and constructed for movement relative to the motor housing along a travel path, wherein one of the first and second magnetic pole assemblies of the rotor and the stator is extended in relation to the other one of the first and second magnetic pole assemblies of the rotor and the stator by a portion corresponding to the travel path;

a spindle drive operatively connected to the rotor and supported by the motor housing for implementing the movement of the rotor along the travel path; and a switching assembly constructed for selective operation of the electric drive as a rotary drive or as an injection drive.

2. The adjustment drive of claim 1, wherein the spindle drive includes a threaded nut operatively connected to the rotor, and a threaded shaft rotatably supported by the motor housing and supporting the threaded nut.

3. The adjustment drive of claim 2, wherein the switching assembly includes a first switching element operatively connected to the rotor and constructed for selective engagement with the plasticizing screw to thereby realize a fixed rotative connection between the rotor and the plasticizing screw, a second switching element actuatable to restrain the plasticizing screw against rotation, and a third switching element actuatable to inhibit a rotational movement of the threaded shaft and constructed for variable torque transmission.

4. The adjustment drive of claim 3, wherein the first switching element is a switchable coupling, wherein the second switching element is a one-way locking mechanism or brake, and wherein the third switching element is a brake.

5. The adjustment drive of claim 4, wherein the third switching element is a variable brake.

6. The adjustment drive of claim 1, wherein the motor and the spindle drive and the plasticizing screw are arranged in coaxial relationship to one another.

7. The adjustment drive of claim 1, wherein the second magnetic pole assembly is extended in axial direction in relation to the first magnetic pole assembly.

8. The adjustment drive of claim 1, wherein the rotor is constructed as hollow-shaft rotor defining an interior space, said spindle device projecting into the interior space of the rotor.

* * * * *